(12) United States Patent
Muthukrishnan et al.

(10) Patent No.: US 7,570,654 B2
(45) Date of Patent: *Aug. 4, 2009

(54) SWITCHING DEVICE UTILIZING REQUESTS INDICATING CUMULATIVE AMOUNT OF DATA

(75) Inventors: Raman Muthukrishnan, Santa Clara, CA (US); Anujan Varma, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 902 days.

This patent is subject to a terminal disclaimer.

(21) Appl. No.: 10/744,199

(22) Filed: Dec. 22, 2003

(65) Prior Publication Data

US 2005/0135356 A1 Jun. 23, 2005

(51) Int. Cl.
*H04L 12/54* (2006.01)
*H04J 3/24* (2006.01)
*H04J 3/02* (2006.01)

(52) U.S. Cl. .................. 370/428; 370/474; 370/462

(58) Field of Classification Search .......... 370/389, 370/474, 476, 465, 470, 391, 412–418, 428–429, 370/462

See application file for complete search history.

(56) References Cited

U.S. PATENT DOCUMENTS

| | | | |
|---|---|---|---|
| 4,092,732 A | 5/1978 | Ouchi | |
| 4,331,956 A | 5/1982 | Anderson | |
| 4,335,458 A | 6/1982 | Krol | |
| 4,695,999 A | 9/1987 | Lebizay | |
| 5,127,000 A | 6/1992 | Henrion | |
| 5,191,578 A | 3/1993 | Lee | |
| 5,260,935 A | 11/1993 | Turner | |
| 5,274,785 A | 12/1993 | Kuddes | |
| 5,442,752 A | 8/1995 | Styczinski | |
| 5,483,523 A | 1/1996 | Nederlof | |
| 5,535,221 A | 7/1996 | Hijikata et al. | |
| 5,649,157 A | 7/1997 | Williams | |
| 5,682,493 A | 10/1997 | Yung | |
| 5,682,496 A | 10/1997 | Yung | |
| 5,832,278 A | 11/1998 | Pham | |
| 5,848,434 A | 12/1998 | Young | |
| 5,859,835 A | 1/1999 | Varma | |
| 5,860,097 A | 1/1999 | Johnson | |
| 5,898,688 A * | 4/1999 | Norton et al. | 370/362 |
| 5,978,951 A | 11/1999 | Lawler | |
| 6,052,368 A * | 4/2000 | Aybay | 370/357 |

(Continued)

*Primary Examiner*—Kwang B Yao
*Assistant Examiner*—Candal Elpenord
(74) *Attorney, Agent, or Firm*—Ryder IP Law; Douglas J. Ryder

(57) ABSTRACT

In general, in one aspect, a switching device includes a plurality of ingress ports to receive data from external sources and a plurality of egress ports to transmit data to external destinations. The switching device also includes a plurality of queues to store data waiting to be transmitted from a particular ingress port to a particular egress port. A request generator generates requests for permission to transmit data for the queues. A request indicates a cumulative amount of data contained in a respective queue. A switching matrix provides selective connectivity between the ingress ports and the egress ports. The switching device further includes a scheduler to receive the requests, generate grants based thereon, and configure the switching matrix. The scheduler operates on a pipeline schedule and modifies the requests received to account for grants generated in current period or previous period not reflected in the queues.

19 Claims, 14 Drawing Sheets

U.S. PATENT DOCUMENTS

| | | |
|---|---|---|
| 6,055,625 A | 4/2000 | Nakada |
| 6,061,345 A | 5/2000 | Hahn |
| 6,167,508 A | 12/2000 | Farrell |
| 6,170,032 B1 | 1/2001 | Izzard |
| 6,188,698 B1 | 2/2001 | Galand |
| 6,195,331 B1 * | 2/2001 | Tani ........................... 370/230 |
| 6,282,686 B1 | 8/2001 | Cypher |
| 6,321,306 B1 | 11/2001 | Arimilli |
| 6,359,891 B1 | 3/2002 | Bergantino |
| 6,408,378 B1 | 6/2002 | O'Connor |
| 6,418,148 B1 | 7/2002 | Kumar et al. |
| 6,463,063 B1 * | 10/2002 | Bianchini et al. ...... 370/395.53 |
| 6,665,495 B1 * | 12/2003 | Miles et al. .................... 398/54 |
| 6,785,768 B2 * | 8/2004 | Peters et al. ................. 711/112 |
| 6,804,692 B2 | 10/2004 | Davidson et al. |
| 6,834,193 B1 | 12/2004 | Linderborg et al. |
| 6,836,479 B1 | 12/2004 | Sakamoto et al. |
| 6,862,293 B2 | 3/2005 | Lay et al. |
| 6,950,448 B2 | 9/2005 | Tornetta et al. |
| 6,993,041 B2 | 1/2006 | Yamamoto |
| 6,999,413 B2 * | 2/2006 | Moriwaki et al. ........... 370/228 |
| 7,023,840 B2 * | 4/2006 | Golla et al. ................. 370/360 |
| 7,023,841 B2 | 4/2006 | Dell et al. |
| 7,058,053 B1 | 6/2006 | Schober |
| 7,161,906 B2 | 1/2007 | Dell et al. |
| 7,212,525 B2 * | 5/2007 | Moriwaki et al. ........... 370/386 |
| 7,224,703 B2 * | 5/2007 | Antal et al. ................. 370/473 |
| 7,233,590 B2 | 6/2007 | Beshai |
| 7,245,641 B2 | 7/2007 | Kim et al. |
| 7,246,303 B2 | 7/2007 | Bansal et al. |
| 7,324,541 B2 | 1/2008 | Muthukrishnan et al. |
| 2001/0009552 A1 | 7/2001 | Parruck et al. |
| 2001/0021174 A1 * | 9/2001 | Luijten et al. ............... 370/229 |
| 2001/0038629 A1 | 11/2001 | Shinohara |
| 2002/0085578 A1 | 7/2002 | Dell et al. |
| 2002/0097733 A1 * | 7/2002 | Yamamoto .................. 370/412 |
| 2002/0110086 A1 | 8/2002 | Reches |
| 2002/0176429 A1 | 11/2002 | Calvignac et al. |
| 2002/0176431 A1 | 11/2002 | Golla et al. |
| 2003/0147347 A1 * | 8/2003 | Chen et al. .................. 370/229 |
| 2003/0182480 A1 | 9/2003 | Varma et al. |
| 2004/0017778 A1 * | 1/2004 | Bansal et al. ............... 370/242 |
| 2004/0037302 A1 * | 2/2004 | Varma et al. ................ 370/412 |
| 2004/0252688 A1 | 12/2004 | May et al. |
| 2005/0015388 A1 * | 1/2005 | Dasgupta et al. ............ 707/100 |
| 2005/0129020 A1 * | 6/2005 | Doyle et al. ................. 370/392 |
| 2005/0135355 A1 | 6/2005 | Muthukrishnan et al. |
| 2006/0165070 A1 | 7/2006 | Hall et al. |
| 2006/0251124 A1 | 11/2006 | Colmant et al. |
| 2008/0159145 A1 | 7/2008 | Muthukrishnan et al. |

* cited by examiner

| REQUEST ENCODING | AMOUNT OF DATA IN QUEUE (IN TERMS OF FRAMES) |
|---|---|
| 0000 | EMPTY |
| 0001 | 0 - 1/4 FRAME (1/4 EXCLUDED) |
| 0010 | 1/4 TO 1/2 FRAME |
| 0011 | 1/2 TO 3/4 FRAME |
| 0100 | 3/4 TO 1 FRAME |
| 0101 | 1 TO 1.25 FRAMES |
| 0110 | 1.25 TO 1.50 FRAMES |
| 0111 | 1.50 TO 1.75 FRAMES |
| 1000 | 1.75 TO 2.00 FRAMES |
| 1001 | 2.00 TO 2.25 FRAMES |
| 1010 | 2.25 TO 2.50 FRAMES |
| 1011 | 2.50 TO 2.75 FRAMES |
| 1100 | 2.75 TO 3.00 FRAMES |
| 1101 | 3.00 TO 3.26 FRAMES |
| 1110 | 3.25 TO 3.50 FRAMES |
| 1111 | > 3.50 FRAMES |

FIG. 8

| HIGHEST PRIORITY REQUST THAT IS PART OF THE FRAME | FRAME STATUS (PARTIAL/FULL) | SPL 3-BIT |
|---|---|---|
| 0 | FULL FRAME | 0 |
| 1 | FULL FRAME | 1 |
| 2 | FULL FRAME | 2 |
| 3 | FULL FRAME | 3 |
| 0 | PARTIAL FRAME | 4 |
| 1 | PARTIAL FRAME | 5 |
| 2 | PARTIAL FRAME | 6 |
| 3 | PARTIAL FRAME | 7 |

*FIG. 9A*

| HIGHEST PRIORITY REQUST THAT IS PART OF THE FRAME | FRAME STATUS (PARTIAL/FULL AND AGING) | SPL 3-BIT |
|---|---|---|
| 0 | FULL FRAME OR AGED OUT PARTIAL FRAME | 0 |
| 1 | FULL FRAME OR AGED OUT PARTIAL FRAME | 1 |
| 2 | FULL FRAME OR AGED OUT PARTIAL FRAME | 2 |
| 3 | FULL FRAME OR AGED OUT PARTIAL FRAME | 3 |
| 0 | PARTIAL FRAME | 4 |
| 1 | PARTIAL FRAME | 5 |
| 2 | PARTIAL FRAME | 6 |
| 3 | PARTIAL FRAME | 7 |

FIG. 9B

| PRIORITY 3 | PRIORITY 2 | PRIORITY 1 | PRIORITY 0 |
|---|---|---|---|
| 0 | 1 | 0 | 1 |

FIG. 13

SWITCHING DEVICE UTILIZING REQUESTS INDICATING CUMULATIVE AMOUNT OF DATA

BACKGROUND

Store-and-forward devices, such as switches and routers, are used in packet networks, such as the Internet, for directing traffic at interconnection points. The store-and-forward devices include a plurality of line cards for receiving and transmitting data from/to external sources. The line cards are connected to one another via a backplane and a switching fabric. The backplane provides data paths between line cards and the switching fabric and the switching fabric provides configurable data paths between line cards. The line cards receiving data from external sources (ingress ports) receive data (packets) of various sizes. The data received are stored in queues prior to being transmitted to the appropriate line cards for transmission to external sources (egress ports). The packets include a header that identifies the destination of the packet. The packet is stored in the queue associated with that destination. The packet may also identify a priority for the data and the ingress port may also include queues for the various priorities.

The ingress ports send requests for transmitting data to a scheduler within the switching fabric. The scheduler generates grants for the queues that should transmit packets therefrom. The packets are switched through a crossbar switching matrix in batches. A batch consists of at most one packet selected from each input port. Thus, no more than one of the packets is destined for each output port. The packets in a batch are transferred in parallel across the crossbar switching matrix. While the packets from a scheduled batch are being transferred through the crossbar, the scheduler can select the packets to form the next batch, so that the transmission of the new batch of packets can start as soon as transmission of the current batch ends. At the end of the batch of packets, the fabric scheduler re-configures the crossbar-switching matrix so as to connect input ports to output ports based on next packet destination. Because the packets are transferred in batches, the switching paths in the crossbar-switching matrix are kept unchanged for the duration of the longest packet being transferred across the crossbar in that batch. For example, when a 50-byte packet and a 1500-byte packet are part of the same batch, the crossbar is maintained in the same configuration for the duration of the 1500-byte packet, and only $\frac{1}{30}^{th}$ of the bandwidth of the path is used by the 50-byte packet.

The variable-size packets may be divided into fixed-size units (segments) before switching through the crossbar switching fabric. The segments are combined into the original packet at the output of the fabric. The fabric scheduler selects at most one segment from each input port to form a batch, such that the destination port numbers associated with the cells in the same batch are distinct. The segment size is typically chosen to correspond to the size of the smallest packet switched by the fabric, plus the size of any internal headers added by the router or switch before passing the packet through the fabric. The fabric scheduler computes a new schedule for each batch of segments during the transmission time of the segments. In a high-speed switch, this time interval can be extremely short. For example, with a cell size of 64 bytes and a port rate of 10 Gigabits/second, the fabric scheduler schedules a new batch of cells every 51.2 nanoseconds. The crossbar switching matrix is also configured at intervals of 51.2 nanoseconds. As the port speed is increased, both the fabric scheduler and the crossbar reconfiguration are made correspondingly faster.

The requests from a particular ingress port inform the scheduler of the amount of data that was added to the queue since the last request was sent. That is, the ingress port does not indicate a total amount of data in a corresponding queue. The scheduler maintains a count of the data within the queues. That is, the scheduler adds the data from the requests and subtracts the data that is granted (and eventually de-queued and transmitted) from that queue. For example, if a first request indicated 3 segments were in the queue, two segments have subsequently been granted, and a new request includes 1 segment was queued since the last request, the scheduler will know that the queue contains 2 segments (3 segments in $1^{st}$ request−2 segments granted+1 segment in $2^{nd}$ request). As each request only accounts for data received since the last request, the loss of a request or grant will result in an inconsistent state. If a request is lost, the scheduler will not know that the data identified in the request is part of the queue. If a grant is lost and the ingress port accordingly does not de-queue the data, the scheduler will exclude the data contained in the grant from the count even though the data will not be de-queued or transmitted due to the lost grant.

BRIEF DESCRIPTION OF THE DRAWINGS

The features and advantages of the various embodiments will become apparent from the following detailed description in which:

FIG. 8 illustrates an exemplary encoding scheme for quantizing the amount of data based on frames, according to one embodiment;

FIGS. 9A-B illustrate exemplary SPL mapping tables, according to one embodiment;

FIG. 13 illustrates an exemplary grant service bitmap, according to one embodiment.

DETAILED DESCRIPTION

Store-and-forward devices, such as switches and routers, are used in packet networks, such as the Internet, for directing traffic at interconnection points. Store-and-forward devices include a plurality of interface modules, a switch fabric for selectively connecting different interface modules, and a backplane for connecting the interface modules and the switching fabric. The interface modules include receivers (ingress ports) to receive data from and transmitters (egress ports) to transmit data to multiple sources (e.g., computers, other store and forward devices) over multiple communication links (e.g., twisted wire pair, fiber optic, wireless). Each of the sources may be capable of transmitting/receiving data at different speeds, different quality of service, etc. over the different communication links. The interface modules can transmit/receive data using any number of protocols including Asynchronous Transfer Mode (ATM), Internet Protocol (IP), and Time Division Multiplexing (TDM). The data may be variable length or fixed length blocks, such as cells, packets or frames.

The data received from external sources is stored in a plurality of queues. The queues may be stored in any type of storage device and preferably are a hardware storage device such as semiconductor memory, on-chip memory, off-chip memory, field-programmable gate arrays (FPGAs), random access memory (RAM), or a set of registers. The interface modules may be line cards or chips contained on line cards. A single line card may include a single interface module (receiver or transmitter) or multiple interface modules (receivers, transmitters, or a combination). The interface modules may be Ethernet (e.g., Gigabit, 10 Base T), ATM, Fibre channel, Synchronous Optical Network (SONET), Synchronous Digital Hierarchy (SDH) or various other types. A line card having multiple interface modules may have the same type of interface modules (e.g., ATM) or may contain some combination of different interface module types. The backplane may be electrical or optical.

Figure 1:
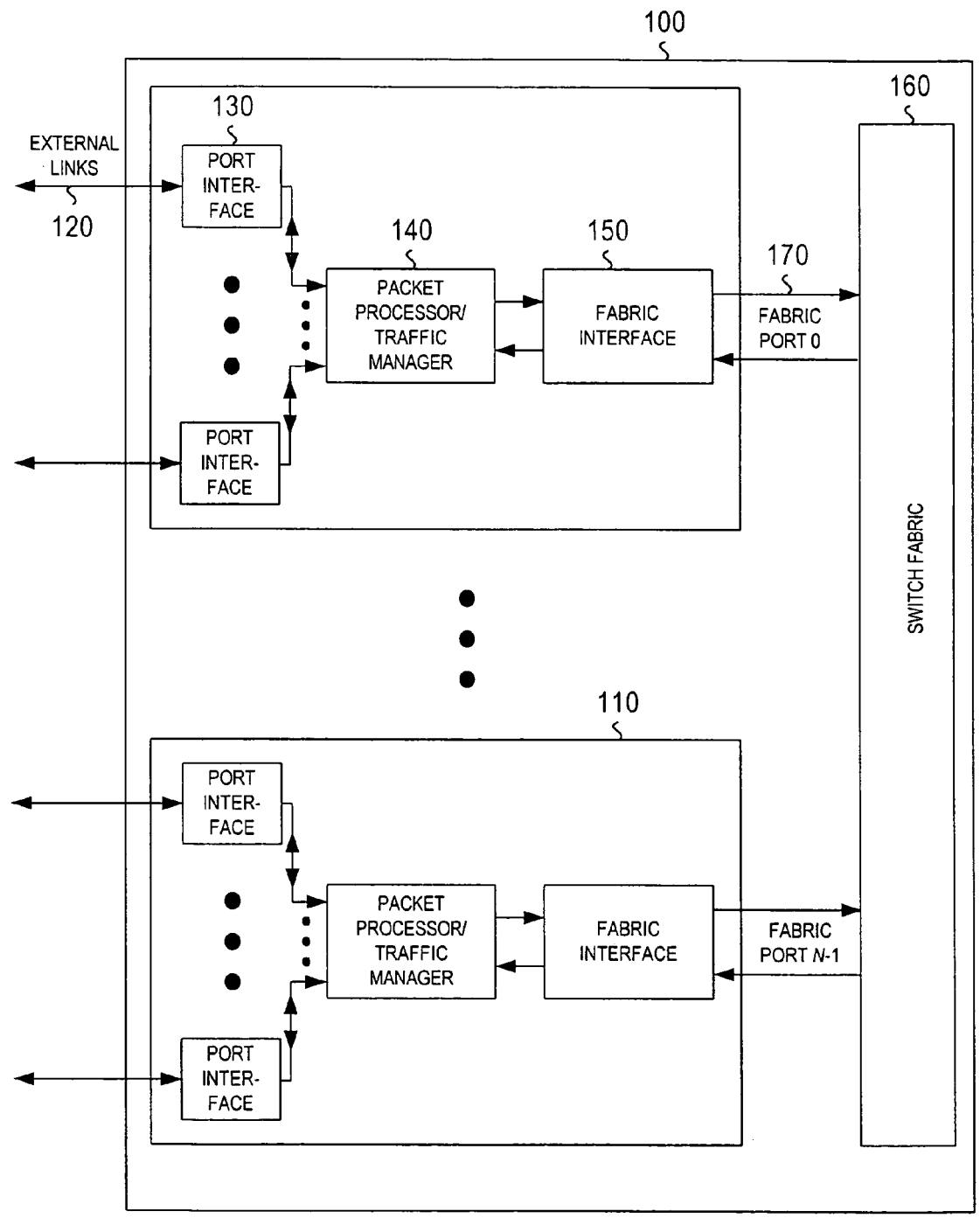
FIG. 1 illustrates an exemplary block diagram of a store-and-forward device, according to one embodiment.

FIG. 1 illustrates an exemplary block diagram of a store-and-forward device 100. The device 100 includes a plurality of line cards 110 that connect to, and receive data from and transfer data to, external links 120. The line cards include port interfaces 130, packet processor and traffic manager devices 140, and fabric interfaces 150. The port interfaces 130 provide the interface between the external links 120 and the line card 110. The port interface 130 may include a framer, a media access controller, or other components required to interface with the external links (not illustrated). The packet processor and traffic manager device 140 receives data from the port interface 130 and provides forwarding, classification, and queuing based on flow (e.g., class of service) associated with the data. The fabric interface 150 provides the interface necessary to connect the line cards 110 to a switch fabric 160. The fabric interface 150 includes an ingress port interface (from the line card 110 to the switch fabric 160) and an egress port interface (from the switch fabric 160 to the line card 110). For simplicity only a single fabric interface 150 is illustrated, however multiple fabric interfaces 150 could be contained on each line card 110.

The switch fabric 160 provides re-configurable data paths between the line cards 110 (or fabric interfaces). The switch fabric 160 includes a plurality of fabric ports 170 (addressable interfaces) for connecting to the line cards 110 (port interfaces). Each fabric port 170 is associated with a fabric interface (pair of ingress fabric interface modules and egress fabric interface modules). The switch fabric 160 can range from a simple bus-based fabric to a fabric based on crossbar (or crosspoint) switching devices. The choice of fabric depends on the design parameters and requirements of the store-and-forward device (e.g., port rate, maximum number of ports, performance requirements, reliability/availability requirements, packaging constraints). Crossbar-based fabrics are the preferred choice for high-performance routers and switches because of their ability to provide high switching throughputs.

It should be noted that a fabric port 170 may aggregate traffic from more than one external port (link) associated with a line card. A pair of ingress and egress fabric interface modules is associated with each fabric port 170. When used herein the term fabric port may refer to an ingress fabric interface module and/or an egress fabric interface module. An ingress fabric interface module may be referred to as a source fabric port, a source port, an ingress fabric port, an ingress port, a fabric port, or an input port. Likewise an egress fabric interface module may be referred to as a destination fabric port, a destination port, an egress fabric port, an egress port, a fabric port, or an output port.

Figure 2:
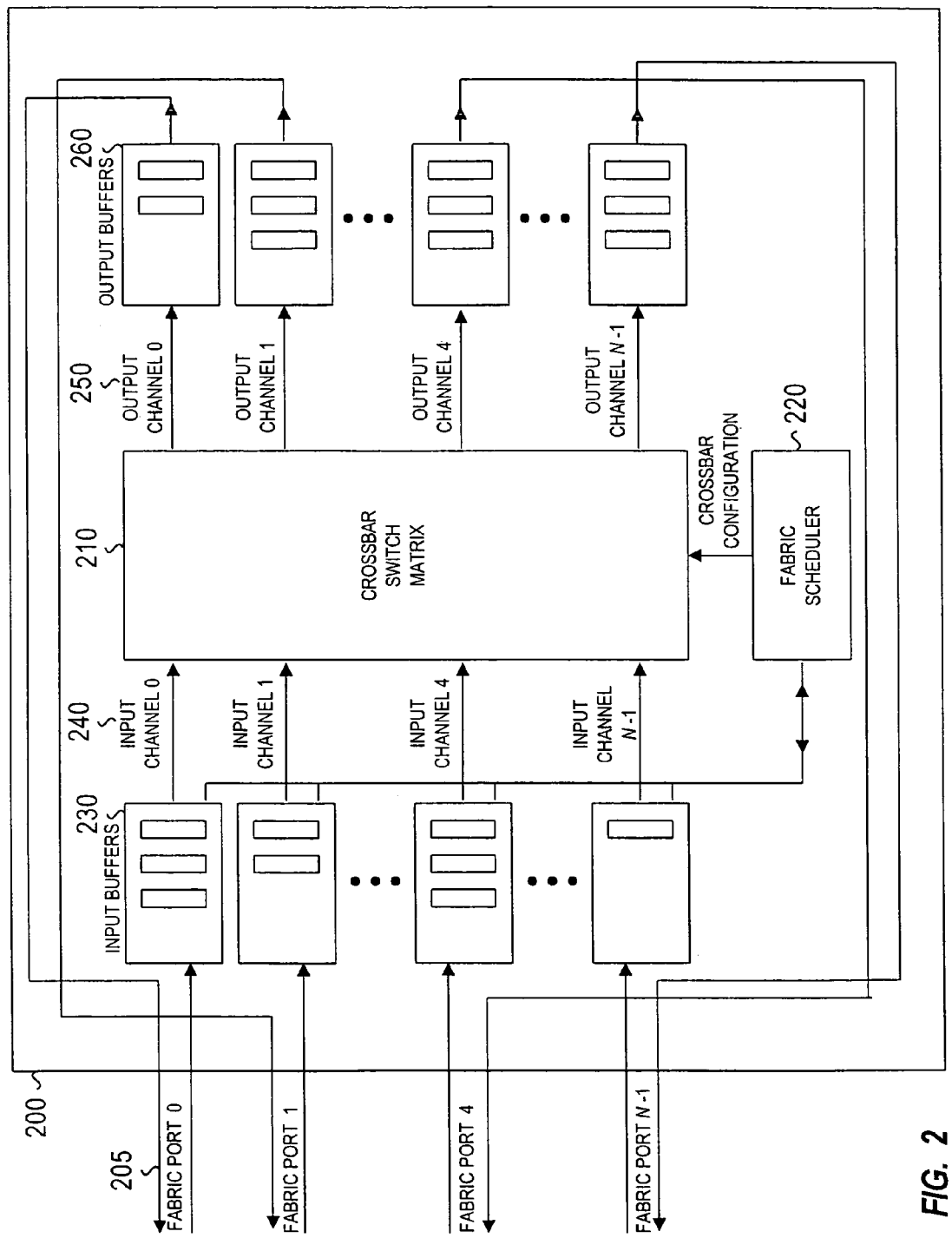
FIG. 2 illustrates an exemplary block diagram of a packet-based packet switch fabric, according to one embodiment.

FIG. 2 illustrates an exemplary block diagram of a packet-based switch fabric 200. The fabric 200 includes a plurality of fabric ports 205 to connect to associated fabric interfaces (ingress/egress pair), a crossbar switching matrix 210, a fabric scheduler 220, input buffers 230 to hold arriving packets from the fabric ports 205, input channels 240 to transmit data from the input buffers 230 to the crossbar matrix 210 (e.g., associated ports), output channels 250 to transmit data from the crossbar matrix 210 (e.g., associated ports), and output buffers 260 to hold packets prior to departing from the fabric ports 205.

A backplane consists of a plurality of channels (input 240 and output 250) that provide connectivity between the fabric ports 205 and the crossbar matrix 210 so as to provide switching connectivity between line cards. With advances in serial communication technologies, the channels 240, 250 are preferably high-speed serial links. High-speed serial data can be carried over either electrical backplanes or optical backplanes. If an optical backplane is used, the transmitting line cards convert electrical signals to optical signals and send the optical signals over fiber, and the destination line cards receive the optical signals from the fiber and reconvert them to electrical signals.

The crossbar matrix 210 is logically organized as an array of N×N switching points, thus enabling any of the packets arriving at any of N input ports to be switched to any of N output ports, where N represents the number of fabric ports. These switching points are configured by the fabric scheduler 220 at packet boundaries. Typically, the packets are switched through the crossbar switching matrix 210 in batches, where a batch consists of at most one packet selected from each input port, in such a way that no more than one of the packets is destined for each out port.

The packets, arriving at the input buffers 230, has a header containing the destination port number where it needs to be switched. The fabric scheduler 220 periodically reads the destination port information from the headers of the packets stored in the input buffers 230 and schedules a new batch of packets to be transferred through the crossbar switching matrix 210. The packets in a batch (a maximum of N packets) are transferred in parallel across the crossbar switching matrix 210. While the packets from a scheduled batch are being transferred through the crossbar 210, the scheduler 220 can select the packets to form the next batch, so that the transmission of the new batch of packets can start as soon as transmission of the current batch ends. At the end of a batch of packets, the fabric scheduler 220 re-configures the crossbar switching matrix 210 so as to connect the input ports to the corresponding output ports where the next packets are destined to. Because the packets in the exemplary switching fabric 200 are transferred in batches, the switching paths in the crossbar switching matrix 210 are kept unchanged for the duration of the longest packet being transferred across the crossbar 210 in that batch. For example, when a 50-byte packet and a 1500-byte packet are part of the same batch, the crossbar 210 is maintained in the same configuration for the duration of the 1500-byte packet.

Figure 3:
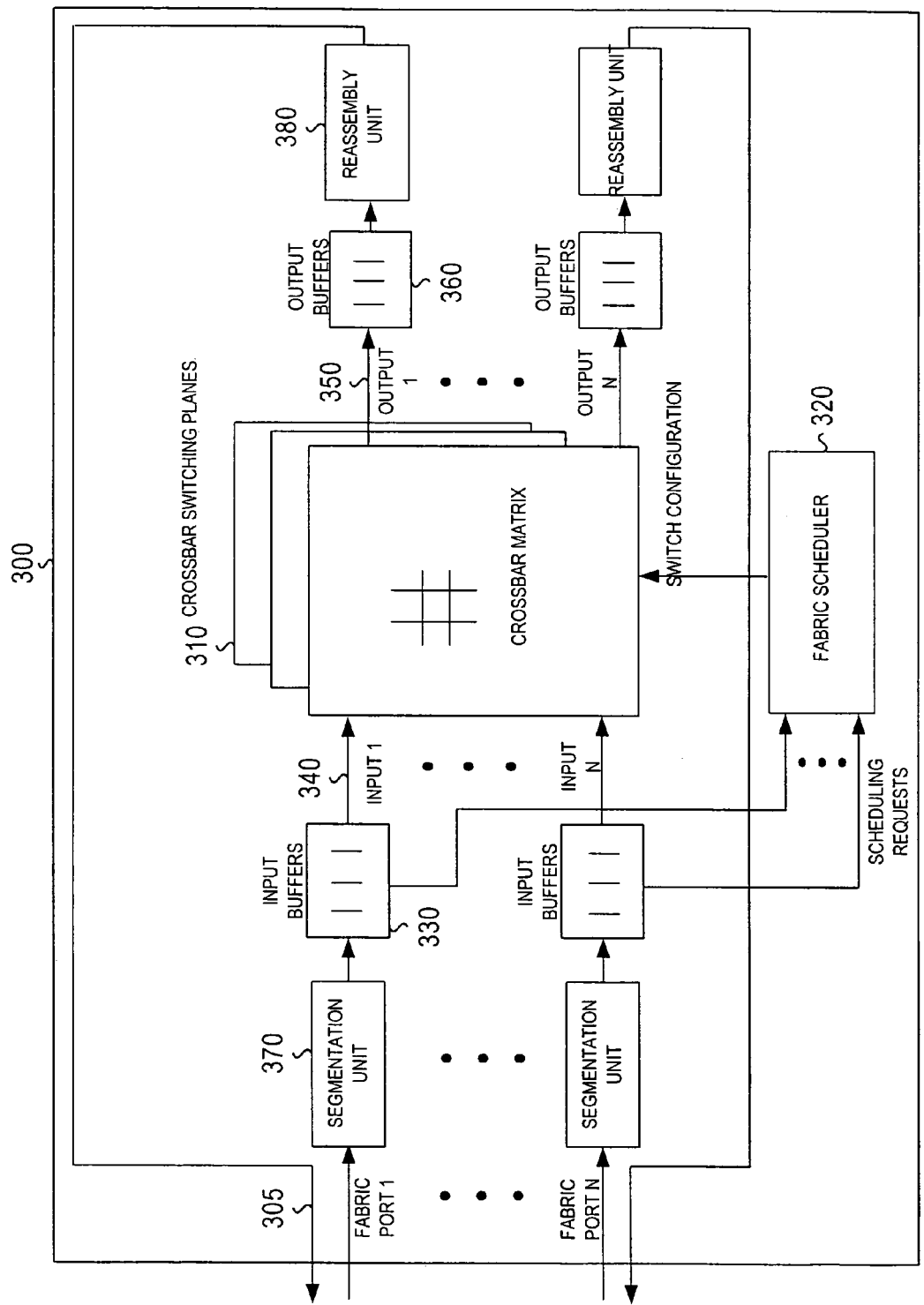
FIG. 3 illustrates an exemplary block diagram of a segment-based switching fabric, according to one embodiment.

FIG. 3 illustrates an exemplary block diagram of a segment-based switching fabric 300. Like the switch fabric 200, the switch fabric 300 includes fabric ports 305, a crossbar switching matrix 310, a fabric scheduler 320, input buffers 330, channels 340, 350 and output buffers 360. In addition, the switch fabric 300 includes segmentation units 370 and reassembly units 380. The segmentation unit 370 divides the packets received at the fabric port 305 into segments (cells) having a fixed size. In addition the segmentation unit 370 adds a header to the segments so that the segments can be identified with one another and put back together. The reassembly unit 380 receives the segments and re-generates the packet based on the segments. The reassembly unit 380 uses the headers to identify which segments are part of the packet.

The fixed size of the segments may be chosen to correspond to the size of the smallest packet switched by the switch fabric 300, plus the size of any internal headers added. For example, if the smallest packet is of size 64 bytes, and the size of the internal headers is 16 bytes, a segment size of 64+16=80 bytes can be chosen. A packet larger than 64 bytes, arriving in the switch fabric 300, will be segmented into multiple segments of maximum size 64 bytes by the segmentation unit 370 before switching through the crossbar matrix 310. If a last segment has less than 64 bytes it is padded to 64 bytes so that the segments are of the same size. The segments are appended with a header (e.g., 16 bytes). After the segments (data and header) are switched through the crossbar matrix 310 they are combined into the original packet by the reassembly unit 380.

The fabric scheduler 320 works in the same way as the fabric scheduler 220 from FIG. 2. The segments arriving at the input buffers have a header containing the port number where it is destined to. The fabric scheduler 320 may select one segment from each input port to form a batch, such that the destination port numbers associated with the segments in the same batch are distinct. The segments within the same batch are then transmitted in parallel. Because the segments are of the same size, no bandwidth is wasted in the crossbar matrix 310. The fabric scheduler 320 determines (schedules) the next batch for transmission during transmission of the current batch. In a high-speed switch, this time interval can be extremely short. For example, with a segment size of 80 bytes and a port rate of 10 Gigabits/second, the fabric scheduler schedules a new batch of segments every 64 nanoseconds ((80 bytes×8 bits/byte)/10 Gbs). The crossbar switching matrix 310 is also configured at intervals of 64 nanoseconds. As the port speed is increased, both the fabric scheduler 320 and the crossbar 310 reconfiguration are made correspondingly faster.

Figure 4:
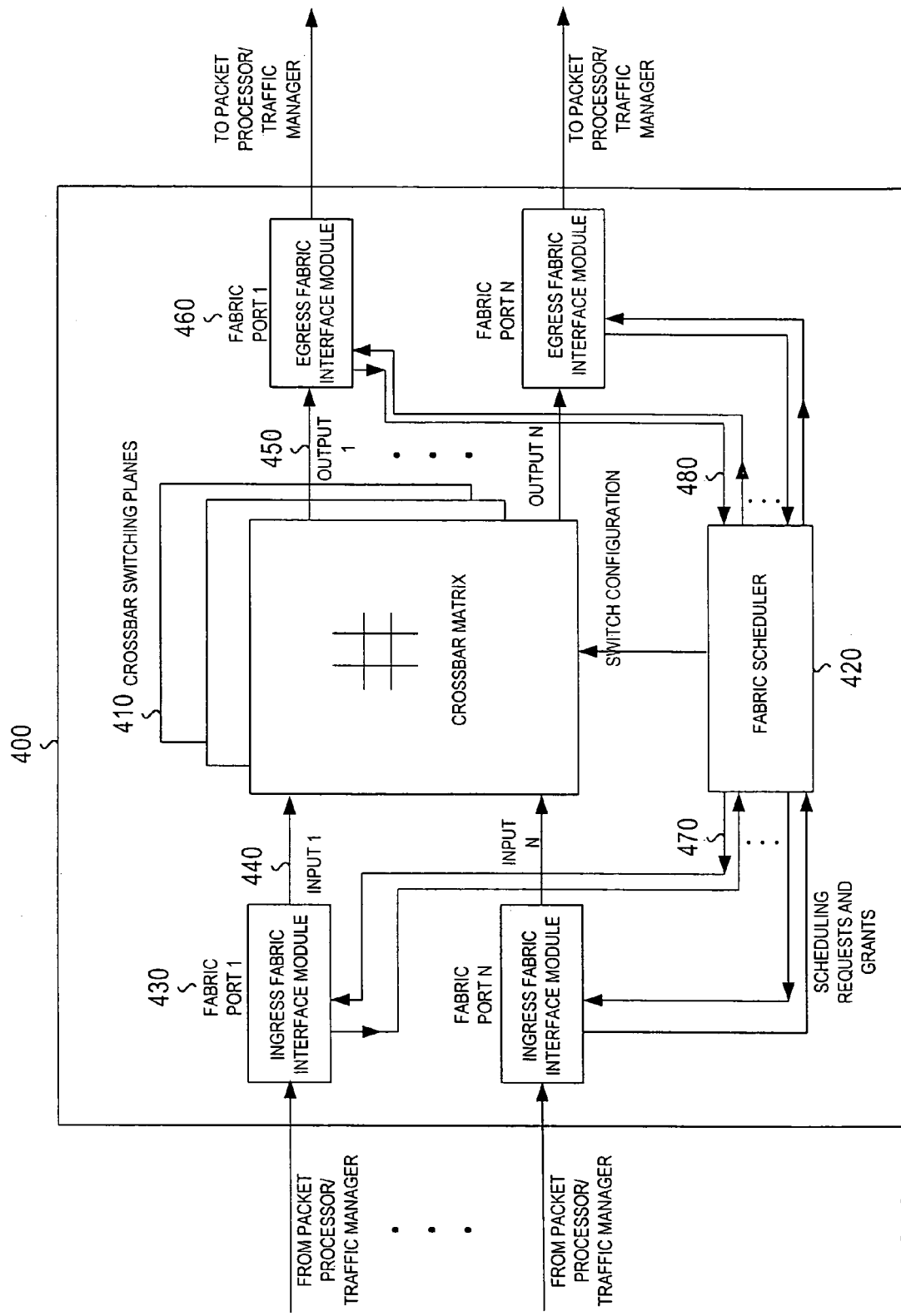
FIG. 4 illustrates an exemplary block diagram of a frame-based switching fabric, according to one embodiment.

FIG. 4 illustrates an exemplary block diagram of a frame-based switching fabric 400. The switching fabric 400 introduces a data aggregation scheme wherein variable-size packets arriving into the store-and-forward device (e.g., router, switch) are first segmented into smaller units (segments) and then aggregated into convenient blocks ("frames") for switching. The switching fabric 400 includes a switching matrix 410 (made up of one or more crossbar switching planes), a fabric scheduler 420, ingress fabric interface modules 430, input data channels 440 (one or more per fabric port), output data channels 450 (one or more per fabric port), egress fabric interface modules 460, ingress scheduling channels 470 and egress scheduling channels 480. According to one embodiment, the data channels 440, 450 are separate from the scheduling channels 470, 480. In an alternate embodiment, the scheduling information can me multiplexed with data and sent over the same physical links, and the scheduler 420 can be integrated with one or more crossbar planes 410 as well. However, the scheduling function remains logically separate from the data path.

The ingress fabric interface module 430 receives packets from the packet processor/traffic manager device on a line card. The packet processor/traffic manager processes the packets arriving from the external links, determines the fabric port number associated with the incoming packet (from a header lookup), and attaches this information to the packet for use by the switching fabric 400. The ingress fabric interface module 430 receives the packets, stores the packets in associated queues, and sends the packets to the switching matrix 410 for transfer to a different line card. The egress fabric interface modules 460 receive packets arriving from the switching matrix 410 (typically from a different line card), and pass them on for any egress processing needed in a line card and subsequently for transmission out on the external links.

The ingress fabric interface modules 430 store the packets arriving from the packet processor/traffic manager in a set of queues. The packets destined to the egress fabric interface modules 460 are maintained in a separate queue (isolated from each other). In addition, the packets destined to a specific egress fabric interface module 460 can further be distributed into multiple queues based on their class of service or relative priority level. These queues may be referred to as virtual output queues. The packets may be broken down into segments and the segments stored in the queues. The segments can be variable size but are limited to a maximum size.

The segments stored in its queues are aggregated into frames by the ingress fabric interface module 430 before transmission to the crossbar matrix 410. The maximum size of the frame is a design parameter. The time taken to transmit the maximum-size frame is referred to as the "frame period." This interval is the same as a scheduling interval (discussed in further detail later). The frame period can be chosen independent of the maximum packet size in the system. Typically, the frame period is chosen such that a frame can carry several maximum-size segments. The frame period is often determined by the reconfiguration time of the crossbar data path. For example, the switching time of certain optical devices are currently of the order of microseconds. If such devices are used for the data path, the frame period is on the order of microseconds. Electronic switching technologies, on the other hand, are significantly faster, allowing frame periods in the range of tens to hundreds of nanoseconds. Another factor that needs to be taken into account while choosing the frame period is the overhead in synchronizing the egress fabric interface modules with the data streams at the start of a frame. Data streams are broken at the end of a frame and the new arriving frame may be from a different ingress fabric interface module (resulting in a change in frequency and/or phase of the clock associated with the data stream). Accordingly, the egress fabric interface modules re-establish synchronization at the boundary of frames.

The ingress fabric interface module constructs a frame by de-queuing one or more segments from its queues when instructed to do so by a grant from the fabric scheduler (discussed in further detail later). A grant may be received by an ingress fabric interface module during each frame period. The grant identifies the subset of queues from which data need to be de-queued based on the destination fabric port (egress fabric port module). This de-queuing of segments proceeds until the frame is full. Because the segments cannot further be broken up, and a frame consists of a whole number of segments, frames constructed may not have the same size, but will be within the maximum size specified. Alternatively, the frames that do not equal the maximum frame size can be padded to the maximum size so that the frames are the same size.

The fabric scheduler 420 schedules transmissions from the ingress fabric interface modules 430 to the egress fabric interface module 460 via the crossbar matrix 410. The operation of the scheduler 420 is synchronous with respect to a frame clock. That is, the scheduler performs it operations with a clock cycle that is the same as the clock cycle to transmit a frame.

Figure 5:
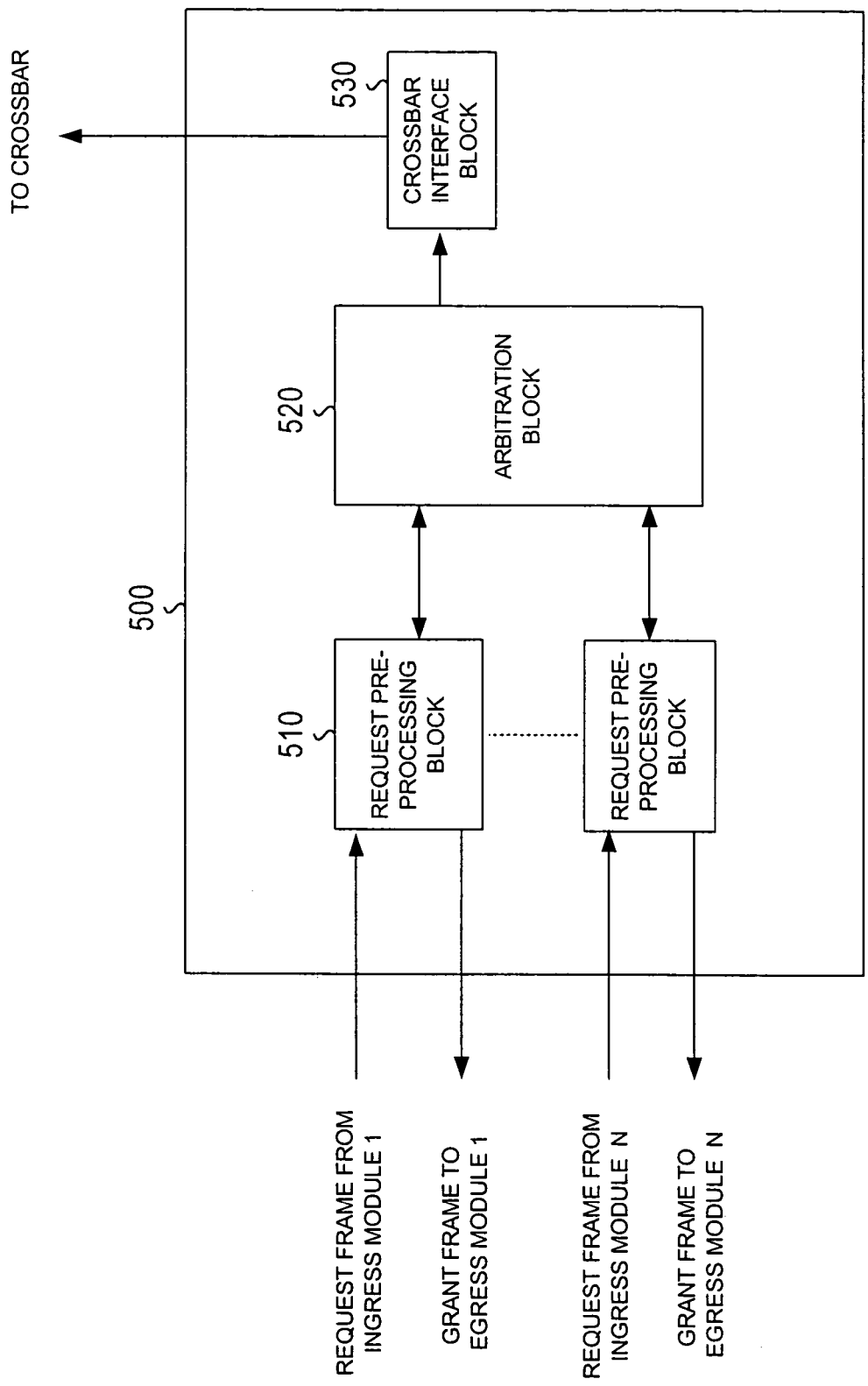
FIG. 5 illustrates an exemplary block diagram of a fabric scheduler, according to one embodiment.

FIG. 5 illustrates an exemplary block diagram of a fabric scheduler 500. The fabric scheduler 500 can be used within any of the packet-based switch fabrics 200, segment-based switch fabrics 300, or frame-based switch fabrics 400. The fabric scheduler 500 includes a plurality of request pre-processing blocks 510, an arbitration block 520, and a crossbar interface block 530. A request frame is received from the ingress fabric interface modules, and the request pre-processing block 510 processes the requests and forwards the requests (including priority levels) to the arbitration block 520. The arbitration block 520 determines matches between the input ports and output ports and generates a schedule based thereon (list of grants indicating which ingress modules will send data to which egress modules). The schedule (grants) is provided to the request pre-processing blocks 510 and the crossbar interface block 530. The request pre-processing blocks 510 send the grant message to the egress fabric interface modules. The crossbar interface block 530 configures the crossbar based on the grants (ingress module to egress module matches).

A basic fabric scheduler implementation may need only the basic information (ID of non-empty queues) to be passed from the ingress fabric interface modules. More powerful scheduler implementations, supporting additional features, require more information to be passed. For example, the information can optionally include many other attributes, such as the amount of data in the queue and the "age" (time interval since a packet was last transmitted) of the queue. In addition, if there are multiple queues associated with each destination port, based on priority or class, then the information may include the amount of data queued at each priority level for each destination port.

Based on the information received from the ingress fabric interface modules, the fabric scheduler computes a schedule for the crossbar planes. The schedule is computed by performing a matching of the requests received from the ingress fabric interface modules and resolving any conflicts therebetween. The scheduler then sets the crossbar matrix (planes) to correspond to this setting. If there are multiple crossbar planes used to stripe the data, then the planes are set in parallel to the same configuration. After the fabric scheduler computes its schedule, the scheduler communicates back to the ingress fabric interface modules the schedule information (grants) computed. The information sent to a particular ingress module includes, at a minimum, the destination fabric port number to which it was matched. Upon receiving this information, the ingress fabric interface modules de-queue data (segments) from the associated queue(s) and transmit the data (frames) to the crossbar data planes (previously discussed). This is done in parallel by the interface modules. Because the fabric scheduler sets the crossbar planes to correspond to the schedule information (grants) communicated to the ingress fabric interface modules, the data transmitted by the ingress modules will reach the intended destination egress interface modules.

While communicating the schedule information (grants) to the ingress fabric interface modules, the fabric scheduler may optionally send information about the computed schedule to the egress fabric interface modules. Specifically, the scheduler may send to the egress modules the port number associated with the ingress module that will be transmitting data to it in that cycle. Although this information can be provided within the data stream itself (as part of header), sending it directly from the fabric scheduler enables the egress modules to detect errors by comparing the source of the arriving data (obtained from the headers) with the scheduler-supplied port number. A mismatch indicates an error or failure in the switch fabric system. The arriving data can be discarded in such an event, thus avoiding delivery of data to an unintended port.

The operations of a switch fabric include: communicating schedule requests from the ingress modules to the fabric scheduler (request), the scheduler's computation of a schedule and communicating the results in the form of grants to the ingress interface modules and possibly the egress interface modules (schedule), configuring the crossbar planes to correspond to the computed schedule and de-queuing data from the queues associated with the grants (configure), and the transmission of the data from the ingress modules to the egress modules (transmission). The fabric scheduler is responsible for receiving requests, scheduling/issuing grants, and configuring the crossbar. In a large switch fabric with several fabric ports, the ingress and egress fabric interface modules may be distributed over several line cards and the crossbar data paths may consist of several switching planes located over multiple cards. Configuring a large switch fabric (large number of inputs and outputs) may take several clock cycles. Thus, the overheads associated with the operations of the fabric scheduler (receive request, schedule computation, and crossbar configuration) can be significant. No data can be transmitted until these operations are completed so a large amount of the switch bandwidth can be potentially lost.

Figure 6:
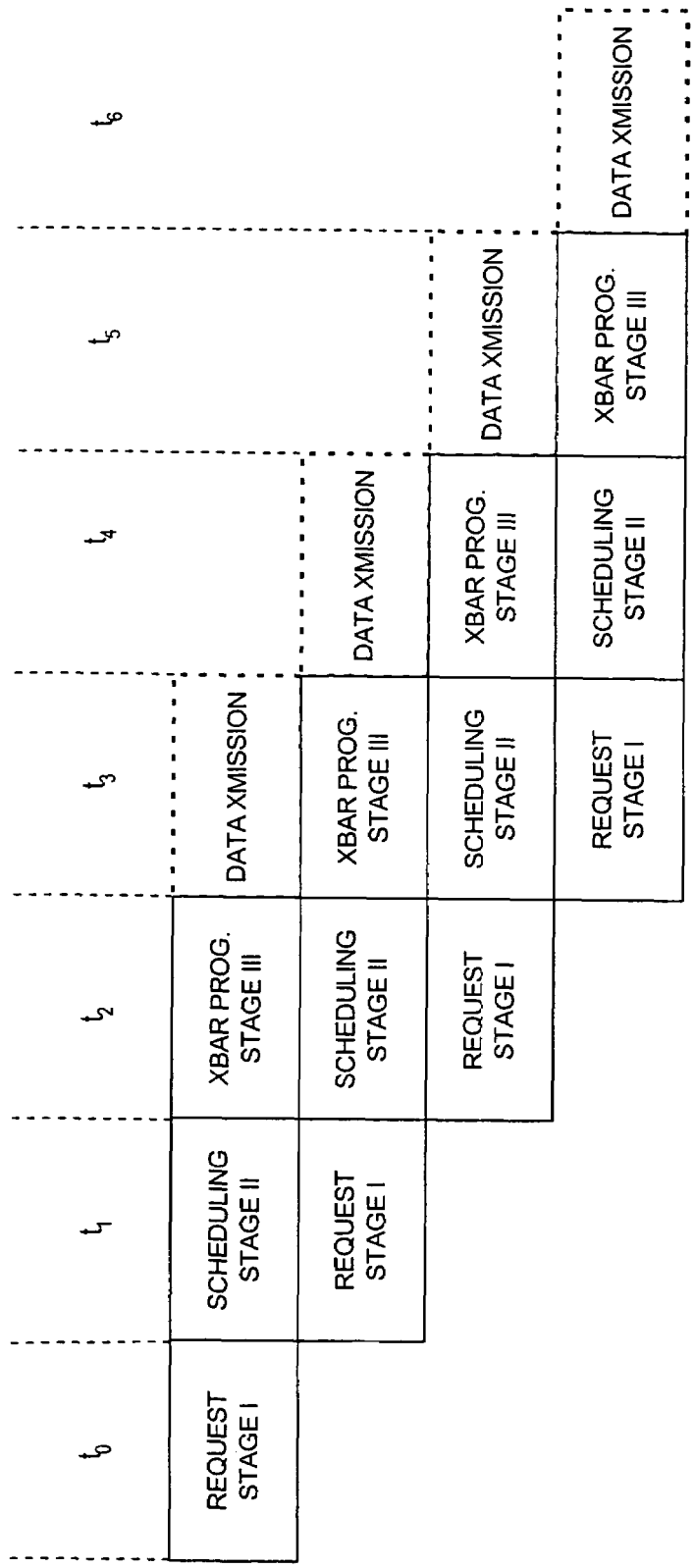
FIG. 6 illustrates an exemplary pipeline schedule for a switch fabric, according to one embodiment.

FIG. 6 illustrates an exemplary pipeline schedule for a switch fabric. The pipeline schedule includes 4 stages. Stage I is the request stage. During this stage, the ingress fabric interface modules send their requests to the fabric scheduler. The scheduler can perform some pre-processing of the requests in this stage while the requests are being received. Stage II is the schedule stage. During this stage, the scheduler matches each input (ingress module) to an output (egress module). At the end of this stage, the scheduler sends a grant message to the ingress fabric interface modules specifying the egress modules to which it should be sending data. The scheduler may also send the grants to the egress modules for error detection during this stage (if grants for ingress and egress are transmitted together—discussed in more detail later). Stage III is the crossbar configuration stage. During this stage, the scheduler configures the crossbar planes based on the matches computed during stage II. While the crossbar is being configured, the ingress modules de-queue data from their queues corresponding to the matched egress module. For a frame-based switch fabric, the ingress modules will form the frames during this stage. The scheduler may also send grants to the egress modules for error detection during this stage. Stage IV is the data transmission stage. During this stage, the ingress modules transmit their data frames across the crossbar.

Each stage occurs during a clock cycle. For packet-based switch fabrics 200 the clock cycle is equivalent to time necessary to transmit longest packet (packet period). For example, if 1500 bytes is the longest possible packet and the port speed was 10 Gbs the packet period is 1.2 microseconds (1500 bytes×8 bits/byte)/10 Gbs=1.2 microseconds). For segment-based switch fabrics 300 the clock cycle is equivalent to the time to transfer a segment (segment period). For example, if the segment size with headers was 80 bytes and the port speed was 10 Gbs the segment period would be 64 nanoseconds ((80 bytes×8 bits/byte)/10 Gbs). For frame based switch fabrics 400 the clock cycle is equivalent to time necessary to transmit the frame (frame period). For example, if the frame size is 3000 bytes with header and the port speed is 10 Gbs the frame period is 2.4 microseconds (3000 bytes×8 bits/byte)/10 Gbs=2.4 microseconds).

As illustrated, during a first clock cycle (e.g., packet period, segment period, frame period), $t_0$, a request is sent from the ingress modules to the scheduler. During a second clock cycle, $t_1$, the scheduler generates a schedule based on the request from the first clock cycle, $t_0$. In addition, new requests are sent to the scheduler from the ingress modules. That is, two tasks are being performed during the second clock cycle, $t_1$. During a third clock cycle, $t_2$, the crossbar is being configured in response to the schedule generated in the second clock cycle, $t_1$, the scheduler is generating a schedule for the requests from the second clock cycle, $t_1$, and additional requests are being sent. That is, three tasks are being performed during this clock cycle. During a fourth clock cycle, $t_3$, the data is being transmitted across the crossbar in accordance with the configuration from the third clock cycle, $t_2$, the crossbar is being configured in response to the schedule generated in the third clock cycle, $t_2$, the scheduler is generating a schedule for the requests from the third clock cycle, $t_2$, and additional requests are being sent. That is, four tasks are being performed during the same clock cycle.

Figure 7:
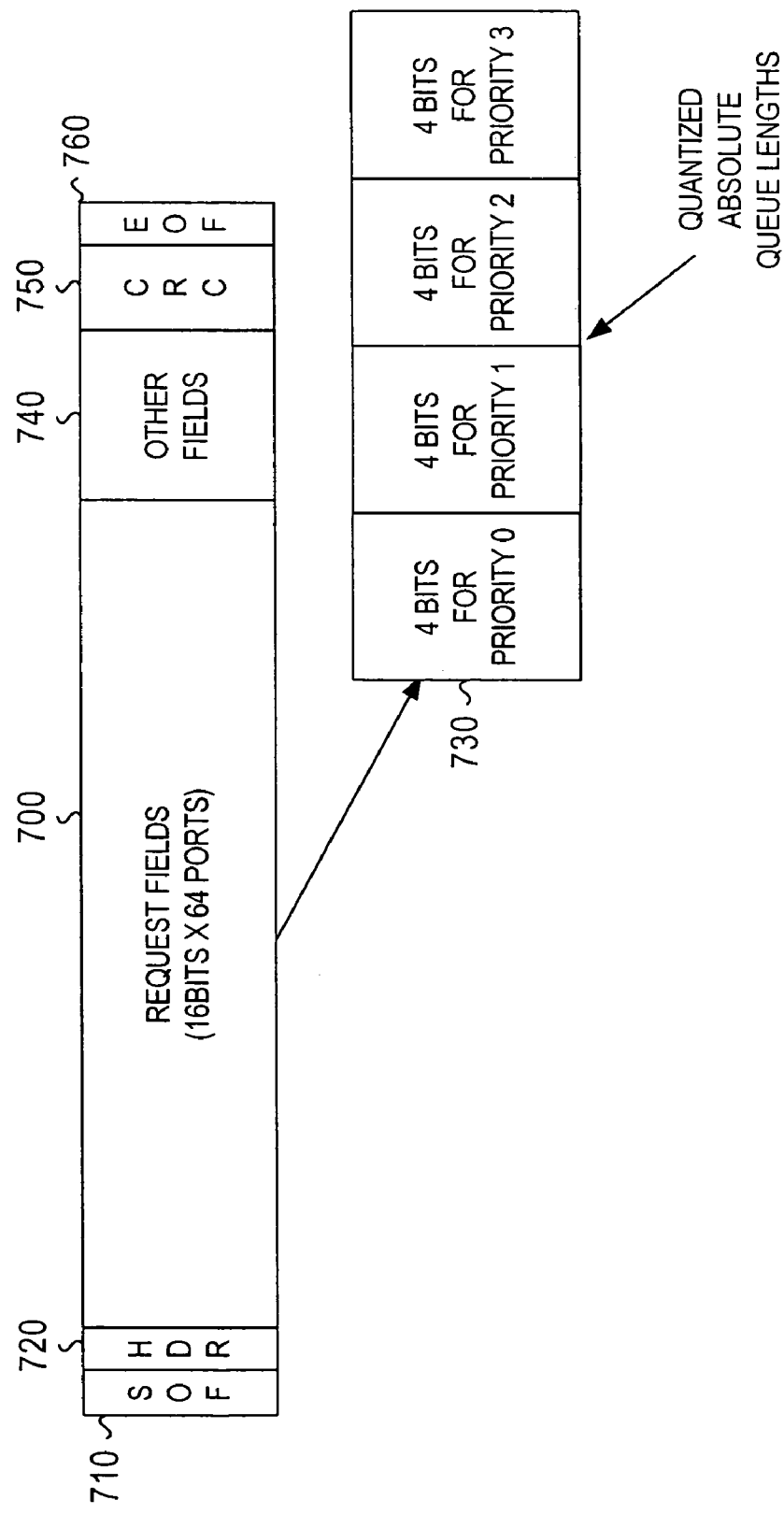
FIG. 7 illustrates an exemplary request frame, according to one embodiment.

The scheduling requests sent from the ingress fabric interface module to the fabric scheduler during frame periods may be formatted as request frames. FIG. 7 illustrates an exemplary request frame 700. The request frame 700 includes a start of frame (SOF) delimiter 710, a header 720, request fields (requests) 730, other fields 740, an error detection/correction field 750, and an end of frame (EOF) delimiter 760. The SOF 710 and EOF 760 fields mark frame boundaries. The header 720 contains a sequence number. The error detection/correction 750 is used to detect transmission errors and may be used to correct errors. According to one embodiment, the error correction/detection 750 is a cyclic redundancy code (CRC). Frames with bad CRC are discarded by the scheduler. Because these requests will automatically be repeated during the following frame periods (discussed in detail below) no retransmission protocol is required. The other fields 740 may be used for functions such as flow control and error control.

The major part of the request frame 700 is the set of requests 730, one for each destination fabric port and priority level. Assuming an example system with 64 fabric ports and 4 priority levels, there would be 256 (64 ports×4 priorities/port) distinct requests 730 in the request frame 700. The requests 730 indicate that there is data in an associated queue available for transmission. The request 730 may summarize the amount of data in the associated queue. The length of the requests 730 (e.g., number of bits) may be chosen taking into account limitations on the total length of the request frame 700, and the granularity of the amount of data in the associated queue needed by the scheduler (scheduling algorithms). For example, the requests 730 may be encoded as 4 bits, thus providing 16 different options for defining the amount of data in the queue. That is, the request 730 can utilize 4 bits to describe the amount of data in the queue. The requests 730 can be encoded in various ways to define the amount of data in the associated queue.

The amount of data in the queue may be described in terms of number of bytes, packets, segments or frames. A packet-based switch fabric could define the amount of data in terms of bytes or packets. A segment-based switch fabric could define the amount of data in terms of bytes, packets, or segments. A frame-based switch fabric could define the amount of data in terms of bytes, packets, segments, or frames. According to one embodiment for a frame-based switch fabric, the amount of data is quantized it in terms of the frame period. That is, the request 730 may be encoded to indicate the number of data frames it would take to transport the data within the associated queue over the crossbar planes.

FIG. 8 illustrates an exemplary encoding scheme for quantizing the amount of data based on frames. As illustrated, the scheme identifies the amount of data based on ¼ frames. Since we have a 3-stage scheduler pipeline (request, grant, configure), the length quantization is extended beyond 3 frames to prevent bubbles in the pipeline.

The request 730 may identify the priority of the data in addition to the amount of data. The scheduler may base it scheduling decisions primarily on the priority of the request. For example, if the request frame indicates that ingress module 1 priority 1 has 0.25 frame queued for egress module 3, and ingress module 2 priority 2 has 1.00 frame queued for egress module 3, then the fabric scheduler will chose the ingress module with the higher priority (ingress module 1) in making scheduling decisions for which ingress module should transmit data to egress module 3. In order to maintain high throughput, the scheduler also gives preference to the amount of data in the queues (e.g., preference to queues having full frames worth of data to send). For example, if the request frame indicates that ingress module 1 has only 0.25 frame of priority 1 queued for egress module 7, while ingress module 2 has 0.5 frame of priority 1 data queued for egress module 7, the fabric scheduler will select the ingress module having more data queued (ingress module 2) to transmit data to egress module 7. When the amount of data for a specific egress module and priority is equal, the scheduler may look to the total amount of data queued for the egress module. For example, if the request frame indicates that ingress module 1 has only 0.25 frame of priority 1 queued for egress module 9, and that ingress module 2 has 0.25 frame of priority 1 and 1.00 frame of priority 2 queued for egress module 9, then the fabric scheduler may select the ingress module having more data queued in total for egress module 9 (ingress module 2) as the amount of data for the highest priority was equal.

Because the scheduler may use a number of external criteria in making scheduling decisions, such as the amount of data queued at each priority level, the relative priorities of the requests, and the efficiency of the data path (how full the data frames will be), the scheduling process can be extremely difficult. According to one embodiment, the external set of scheduling criteria (priority, amount) is mapped into a set of internal scheduler priority levels (SPL).

FIG. 9A illustrates an exemplary mapping table. For this example, it is again assumed that there are 4 priorities (priority 0-3) associated with the queues and that it is a frame-based switch fabric. For each priority, the mapping table differentiates between full frames and partial frames. A frame can be considered full if there are enough segments for that priority queue or lower priority queues associated with the same destination port. For example, if priority 1 for egress port 7 has ¾ of a frame, and priority 2 has ¼ of a frame, then the priority 1 queue is considered full.

In the example above, there are four priorities and 2 statuses (full/partial) so that there is a total of 8 combinations that can be associated with the destinations. Accordingly, we will need a three bit SPL to set the 8 distinct internal priority levels Combinations of the external priority (the highest priority level that is active in the frame) and the conditions such as full/partial frame are translated into one of the 8 internal priority levels (SPLs). As illustrated a full frame at priority 0-3 has SPL of 0-3 and partial frames at priority 0-3 have SPLs of 4-7. The scheduler utilizes the SPLs (8 distinct priority levels) instead of external criteria to make scheduling decisions. In implementation, this mapping can be performed via a programmable lookup table that can be set based on the desired performance objectives.

It should be noted that the above example only differentiated between full and partial frames. If the SPL was 4 bits and could thus have 16 distinct priorities, then the SPLs could be distinguish between up to four different volumes of frames (e.g., 0 to ¼ frame, ¼ to ½ frame, ½ to ¾ frame, ¾ to 1; <1 frame, 1 to 2 frame, 2 to 3 frame, >3 frame).

Low priority partial frames will have low SPLs and data within the associated queues may never get scheduled (those requests may be starved). To prevent starvation of these requests (and the data within those queues) "age timers" will be implemented. The scheduler maintains an age timer for each request so that SPLs for requests that are old can be increased. For each ingress module, the scheduler maintains an N×P age timer value table (where N is the number of egress ports in the system and P is number of external priority levels). The age timer for a particular queue is incremented if the length is non-zero at the end of a scheduling cycle. The timer is reset to zero if data was transmitted in the previous frame period to the egress port and priority level associated with the age timer. A grant-service-bitmap (described later), transmitted from the ingress modules to the fabric scheduler as part of the request frames, indicates that data from a particular priority queue was sent as part of the previous data frame.

According to one embodiment, the age timers may be used to indicate when a queue has aged (exceeded some age timer threshold). A maximum age value (threshold) may be set lower for lower priorities. That is, the threshold for a priority 0 queue may be 30, while the threshold for a priority 3 may be 120. Alternatively, the age timers may provide an aging status that represents the amount of time on a continuum that the queue has not been processed. For example, if the queue has not been serviced for less than 30 cycles the aging status is a 0, if it is between 30-60 cycles it is a 1, between 60-90 cycles a 2 and so on. The higher the aging status the higher the priority that the queue is given by the scheduler. The aging status may be utilized in the formation of the SPLs.

FIG. 9B illustrates an exemplary mapping table utilizing the aging status of the queue. As illustrated, aged out partial frames are given the same SPL as full frames. For example, if priority 0 data is part of a full frame the scheduler assigns a priority level (SPL) of 0, while the scheduler assigns an SPL of 4 for partial frame priority 0 requests. However, if the partial frame priority 0 request ages out, then the request gets promoted from SPL 4 to SPL 0. In this example, the aging status was simply aged out or not, and aged partial frames were given the same priority as full frames. However, the embodiment is not limited to these examples. In fact, if the SPL had more bits and thus provided more distinct priorities, the aging status could be made more granular (as defined above), more distinctions could be made between aged frames and non-aged frames (e.g., aged full frames given higher SPL than full frames), or some combination thereof.

According to one embodiment, the requests from the ingress ports to the scheduler are cumulative. That is, the requests include the data that is currently in the queue. The requests are refreshed every frame period and do not take into account the requests sent in previous frame periods (the requests are memoryless). This embodiment has the advantage that the loss of any request or grant frames will not result in a loss of consistency of state at the ingress modules and the scheduler. If a request frame is lost, the next request frame from the same ingress module will convey the correct amount of data queued in its queues to the scheduler. Similarly, if a grant frame is lost, the scheduler keeps no account of it beyond the duration needed to tolerate the pipeline latency, and will eventually issue fresh grants to transmit the data queued.

As the scheduler utilizes a 3-stage pipeline (request, schedule/grant, crossbar configuration/de-queue), requests received in one frame would not have accounted for the grants sent in the same frame or grants sent in the previous frame (de-queued during the current frame period). That is, as the requests are cumulative the requests will include data until the data is de-queued by the ingress module. Referring back to FIG. 6, the amount of data in a request during frame period $t_2$ would include (1) the data that will be de-queued in response to a grant issued in frame period $t_2$ (this grant is in response to a request in frame period $t_1$) and (2) data being de-queued (while crossbar is being configured) during frame period $t_2$ in response to the request in frame to and the grant in frame period $t_1$. Once the data is de-queued that data would not be included in the next request. So in the example above, the data de-queued during frame period $t_2$ is not included in the request in frame period $t_3$. To correct for this discrepancy, the scheduler subtracts the length of data in grants that are issued in the current frame period and the previous frame period from the request received before processing them, so that the requests are accurate.

Figure 10:
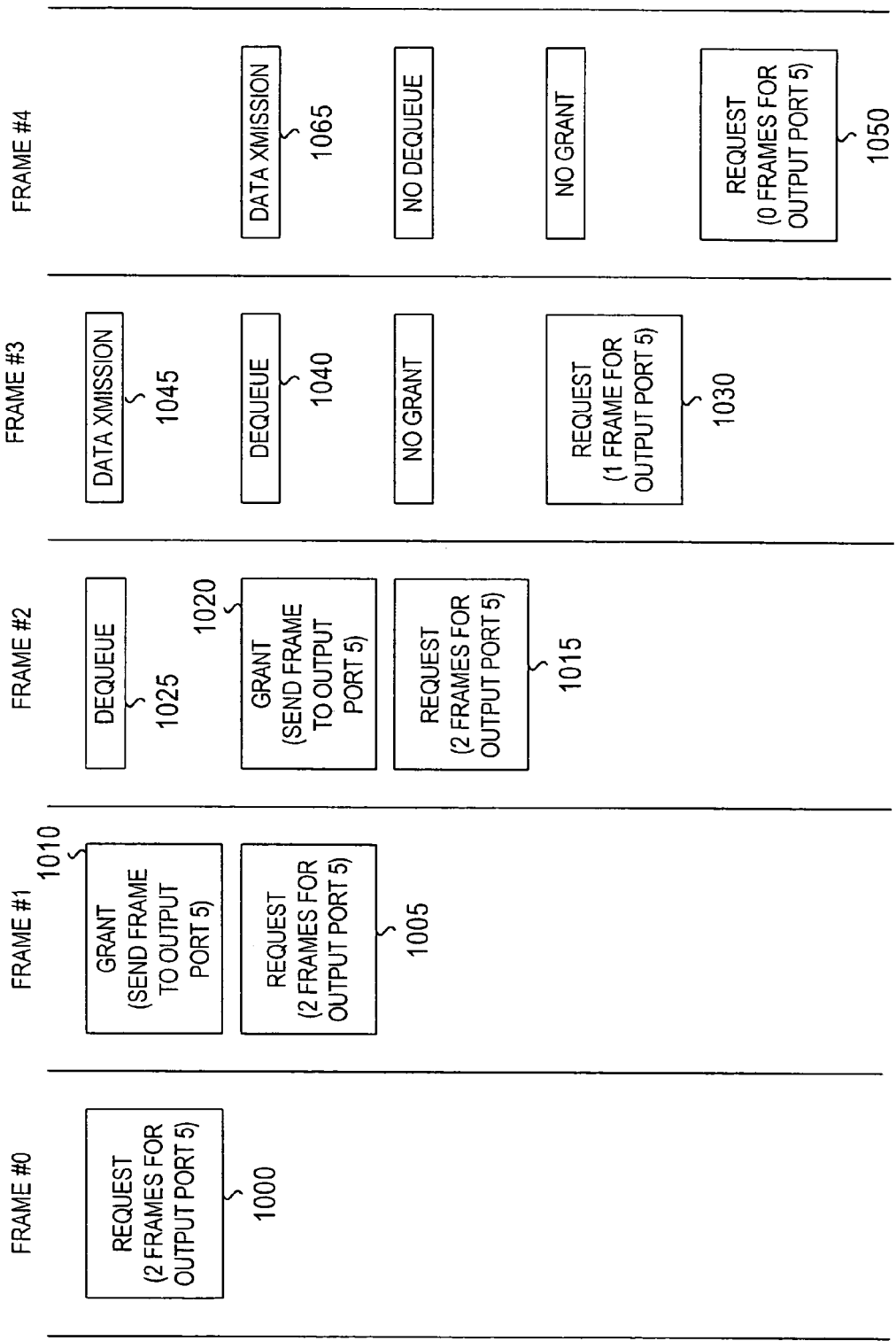
FIG. 10 illustrates a correction process for an exemplary frame schedule for a single ingress port, according to one embodiment.

FIG. 10 illustrates this correction process for an exemplary frame-based scheduler receiving requests from a single ingress port. During frame period 0, the ingress port sends a first request frame 1000 to the scheduler indicating two frames of data are queued for output port 5. During this frame period, the scheduler receives the first request 1000 and assigns an SPL to the first request 1000. The scheduler does not need to make any adjustments to the first request 1000 as no grants were issued in this frame or the previous frame. This SPL will be used in the next frame period to do the scheduling.

The scheduler completes scheduling of the first request 1000 during frame period 1, and transmits a first grant 1010 to the ingress module by the end of the frame period 1. The first grant instructs the ingress module to de-queue and transmit one frame of data to the output port 5. Meanwhile, the ingress port sends a second request 1005 during frame period 1 (same as the first request 1000 since no data has been queued or de-queued). Thus, the second request 1005 still indicates two frames even though the first grant 1010 has been sent during this frame period. The scheduler will adjust the second request 1005 by subtracting one frame from the second request 1005 to take into account the first grant 1010 that was issued during this frame period. The scheduler then assigns an SPL to the second request 1005 (based on the updated value of one frame).

At the beginning of frame period 2, the ingress port sends a third request 1015 to the scheduler (same as the first and second requests 1000, 1005 as no data has yet been de-queued, and no new data has arrived at the ingress module). During frame period 2, it also de-queues one frame of data in response to the first grant 1010 received during frame period 1. Meanwhile, the scheduler performs scheduling of the second request 1005 and sends a second grant 1020 to the ingress module. The second grant 1020 again instructs the ingress module to de-queue and transmit one frame to output port 5.

The third request 1015 received by the scheduler in frame period 2 still indicates two frames of data queued for output port 5, even though the scheduler has already issued grants for them. The scheduler corrects the third request 1015 to take into account the first and second grants (given in the previous frame time and the current frame time). Accordingly, the scheduler determines that there is actually no data in the third request 1015. Therefore, the scheduler does not assign any SPL to the third request 1015 and does not carry the third request 1015 forward for scheduling.

In frame 3, the ingress module sends a fourth request 1030 (indicating one frame of queued data, as the first frame was de-queued during frame period 2). Assume that it receives no grant from the scheduler during frame period 3. In response to the second grant 1020 received during frame period 2, the ingress module de-queues data from its queues to form the $2^{nd}$ frame 1040, and transmits the $1^{st}$ frame 1045 over the crossbar.

During frame period 3, the fourth request 1030 received by the scheduler indicates one frame. The scheduler corrects the fourth request 1030 to take into account (subtract) the second grant 1020 (from the previous frame) and understands that there is no data for this request. Therefore, the scheduler does not assign any SPL to the fourth request 1030 and does not carry the request forward for scheduling. Accordingly, no grants will be issued in response to the fourth request 1030.

In frame 4 the ingress port sends a fifth request 1050 (for 0 frame as both frames have now been de-queued). Alternatively, no request would be sent. The ingress module receives no grant from the scheduler during frame period 4, and does not de-queue any data (as it did not receive a grant in the previous frame period). During frame period 4, the ingress module transmits the $2^{nd}$ frame 1065, which was de-queued in the previous frame period.

During frame period 4, the scheduler does not perform any scheduling as no SPL was assigned during the last frame. Accordingly no grants are issued during this frame period. As no grants were issued in this frame or the previous frame no correction is required to the fifth request 1050.

Examining requests individually shows that the first request 1000 (for 2 frames) is received in frame 0, the first grant 1010 (for one frame) is generated in frame 1, the data is de-queued 1025 in frame 2, and transmitted 1045 in frame 3. The second request 1005 (for 2 frames) is received in frame 1 and is modified to account for the first grant 1010 generated in frame 1, the second grant 1020 is generated in fame 2, the data is de-queued 1040 in frame 3, and the data is transmitted 1065 in frame 4. The third request 1015 is received in frame 2 and is modified to account for the first and second grants 1010, 1020 so no grants are issued.

It should be noted that in the example of FIG. 10, no new data was added to the queue (queued) for simplicity of explaining the process of correcting requests. In reality, new data may be received so that a successive request will indicate more data is in the queue. For example, if between, frame 0 and frame 1 an additional frame of data was queued, the request in frame 1 would indicate 3 frames and then would be corrected by the scheduler to two frames to account for the grant in frame 1. It should also be noted that in the example a grant is received during each frame that the queue contains data. However, it is possible that a grant will not be issued each frame even if the queue has data contained therein.

As previously mentioned, a grant is formed by the scheduler at the end of the scheduling cycle for transmission to the ingress ports and to the egress ports. The grant is sent by the fabric scheduler in a grant frame similar to the request frame it receives from the ingress fabric interface modules. The grant to the ingress module identifies which egress module it should send data to. The ingress module knows which queues are associated with the egress module and thus can form the data frame from those queues. According to one embodiment, the segments used to create the data frame are selected from the highest priority queues first (e.g., priority 0). If the highest priority queue does not have enough segments or has no data, the ingress module moves to the next priority queue to generate the frame. Once the frame is full, and the crossbar is configured, the frame is transmitted to the switching fabric. Starting with the highest priority queues may cause some queues to starve (have segments that are not sent for long periods of time). As previously discussed, the scheduler may take account of the age of the data within the queues in the formation of the SPLs (e.g., partial aged frame is given same SPL as full frame) and thus the selection of requests for that arbitration request block (ingress module). However, if the scheduler selects a request from a particular ingress module for a particular egress module based on a lower level priority, the particular ingress module may have received higher level data prior to the de-queuing of data from queues associated with the particular egress port. Accordingly, the higher priority queue will be used to form the frames and the lower priority queue may again not be serviced.

According to one embodiment, the grant for the ingress module may include the priority as well as the egress module. When the priority level is identified, the ingress module will start de-queuing data from the identified priority queue first. Starting from a specific priority level would prevent the lower priority queues from starving (not being transmitted for a long time). The priority may be included all of the time, or only when the age timers indicate that the data in the queue is starving or is soon to be starving (e.g., has exceeded some time threshold).

The grant message to the ingress module is sent out at the end of the scheduling/grant frame (stage II), so as to give the scheduler enough time to compute the matching. That is, the scheduler can start transmitting the grant frame while it is still working on the computation of the matching, and the result is needed only close to the end of the frame time. This avoids an additional frame time worth of delay in the scheduling pipeline.

The grant frame to the egress module identifies the ingress module that will be transmitting data to the egress module. The egress module can compare the frame received from the crossbar with the grant to determine if the correct data was sent. A mismatch in the frame received and the grant indicates some type of error in transmission and results in discarding of the frame.

Figure 11:
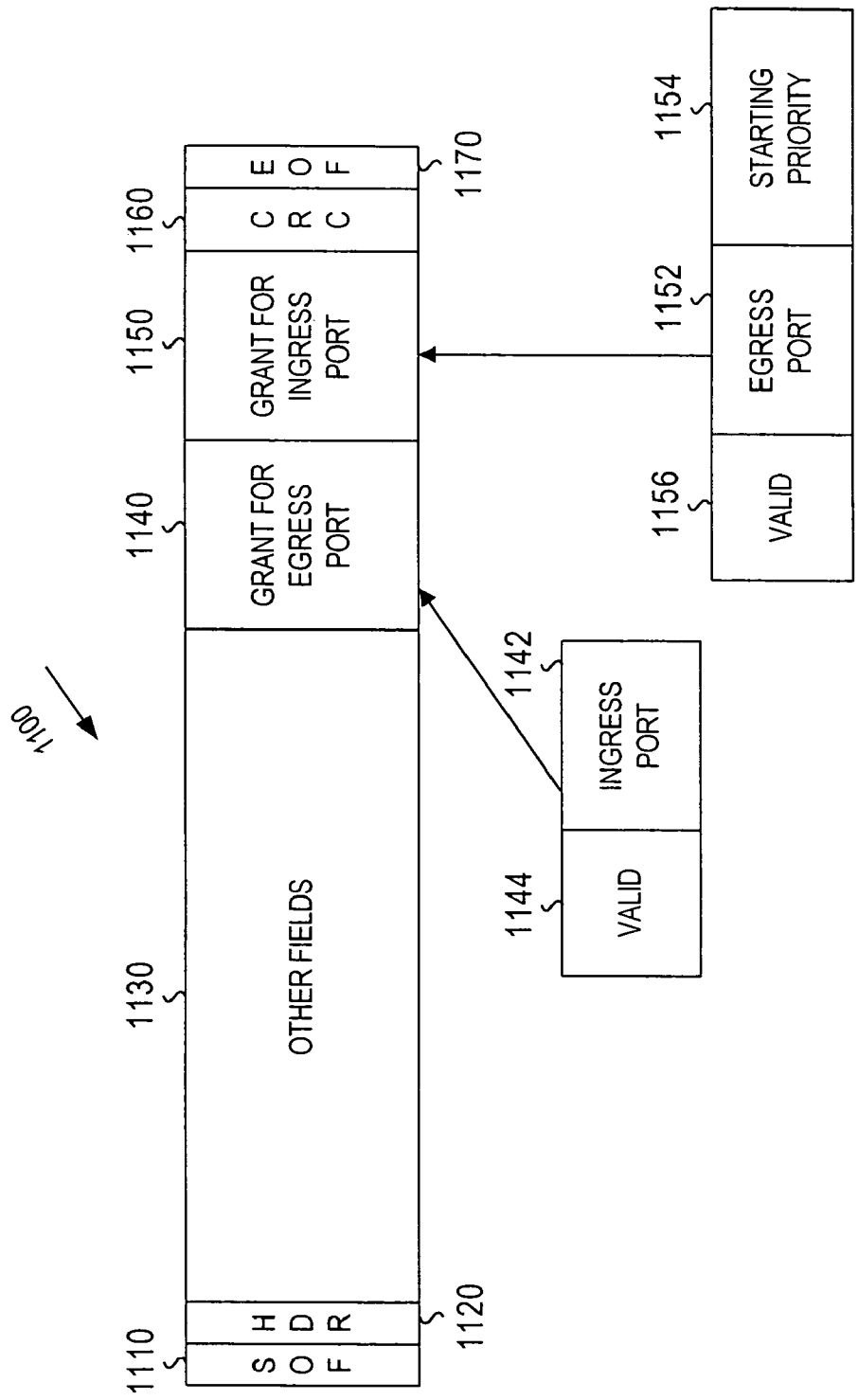
FIG. 11 illustrates an exemplary grant frame, according to one embodiment.

If both the ingress and egress modules associated with the same fabric port are packaged together (e.g., in the same chip or board), the two grant messages could be combined into a single grant frame. FIG. 11 illustrates an exemplary grant frame 1100, combining the messages to ingress and egress fabric interface modules associated with a fabric port. The grant frame 1100 includes a start of frame (SOF) delimiter 1110, a frame header 1120, other fields 1130, an egress module grant 1140, an ingress module grant 1150, an error detection/correction field 1160, and an end of frame (EOF) delimiter 1170. The other fields 1130 can be used for communicating other information to the ingress and egress modules, such as flow control status. The egress module grant 1140 may include an ingress module (input port) number 1142 representing the ingress module it should be receiving data from, and a valid bit 1144 to indicate that the field is valid. The ingress module grant 1150 may include an egress module (output port) number 1152 representing the egress module to which data should be sent, a starting priority level 1154 representing the priority level of the queue that should be used at least as a starting point for de-queuing data to form the frame, and a valid bit 1156 to indicate that the information is a valid grant. The presence of the starting priority field enables the scheduler to force the ingress module to start de-queuing data from a lower priority queue when a higher-priority queue has data. This allows the system to prevent starvation of lower-priority data. The error detection/correction field 1160 (e.g., a Cyclic Redundancy Code (CRC)) is used to detect errors in the grant frame.

Figure 12:
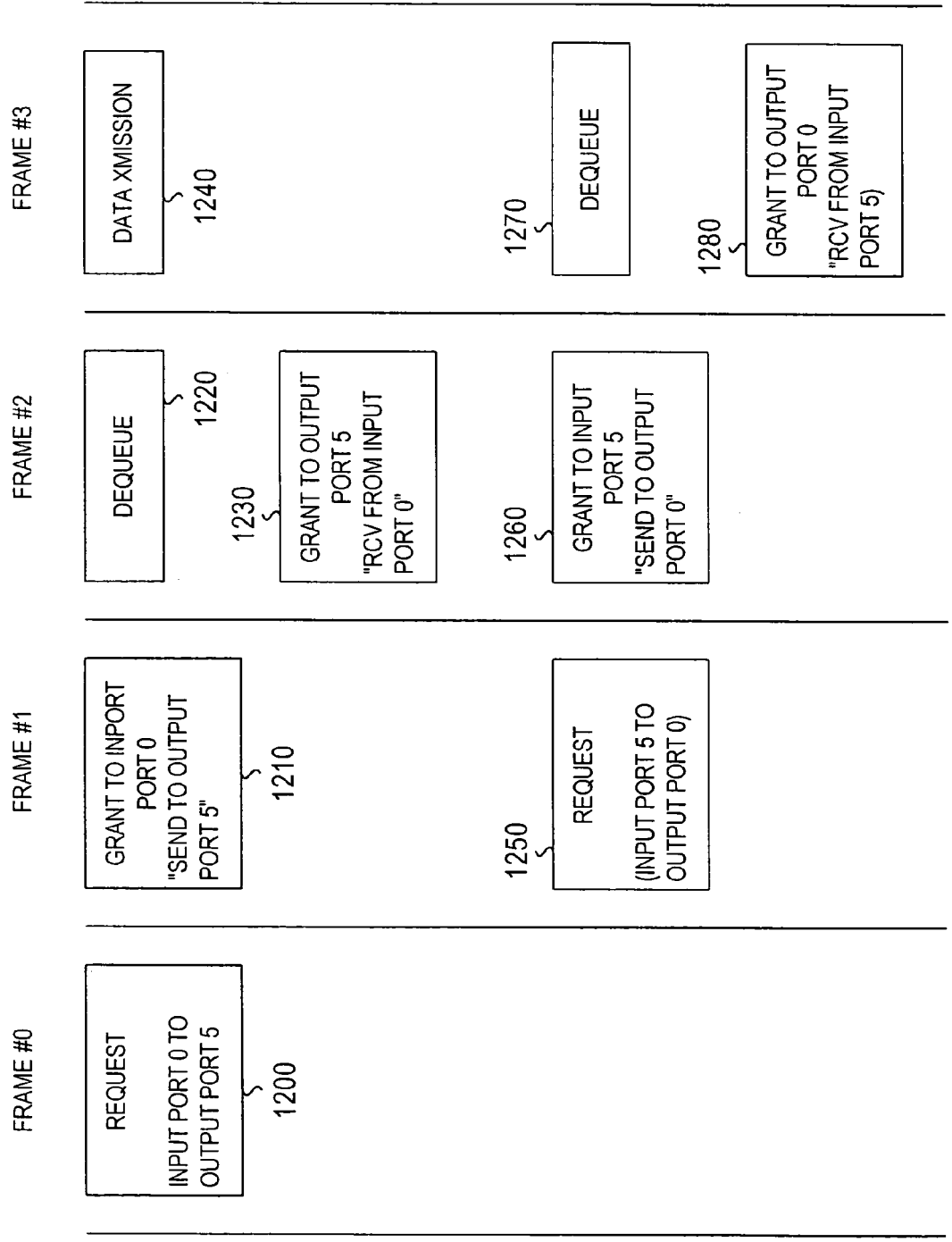
FIG. 12 illustrates an exemplary sequence of grant transmissions, according to one embodiment.

The ingress modules need the grant so that they can de-queue the data in the $3^{rd}$ stage of the scheduler pipeline (crossbar configuration). The egress modules need the grant in the data transmission phase so that they can compare the received frame with the grant. Since the ingress and egress ports use the grant information in different stages of the pipeline, the grant to the ingress module is sent one frame period earlier than the grant to the egress module. FIG. 12 illustrates an exemplary sequence of when the grants would be sent based on two requests. A first request 1200 is received from input port 0 in frame 0 seeking to transmit data to output port 5. The scheduling of the first request 1200 takes place in frame 1 and at the end of this frame a grant 1210 is sent to input port 0 to transmit data to output port 5. In frame 2, the data is de-queued 1220 from a queue or queues associated with output port 5 at input port 0 based on the grant 1210. Also in frame 2, a grant 1230 is sent to output port 5 to expect to receive data from input port 0. The data is transmitted 1240 from input port 0 to output port 5 during frame period 3. A second request 1250 is received from input port 5 in frame 1 to transmit data to output port 0. The scheduling and issuance of a grant 1260 to ingress port 5 occur during frame period 2. The de-queuing 1270 and the issuance of a grant 1280 to output port 0 happen in frame period 3.

If the grant includes the priority, the ingress module should start de-queuing data at the given priority. However, data from other priority levels may be sent as part of the same frame if the specified priority level does not have a full frame of data. It is important for the fabric scheduler to receive information from the ingress module on which priorities were actually serviced while sending the frame. This information is sent back from the ingress module to the fabric scheduler as a grant service bitmap. FIG. 13 illustrates an exemplary grant service bitmap. The grant service bitmap includes one bit for each priority level. If segments from that priority were part of the data frame that was sent during the last frame time the associated bit is active (set to 1). For example, if a frame contains priority 0 and priority 2 segments, the grant service bitmap will set the bits corresponding to priority 0 and priority 2 active (as illustrated). According to one embodiment the grant service bitmap is contained within a request frame.

The bitmap corresponds to the grant that was last serviced by the ingress module. For example, if scheduler sends a grant in Frame 3, the ingress module de-queues segments and forms a data frame during frame period 4, and the ingress module sends the grant service bitmap to the scheduler in frame period 5. When the scheduler receives the bit map having bits 0 and 2 active it knows that segments of priority 0 and priority 2 were part of the data frame sent during the last frame time. Once the scheduler determines that segments were transmitted for a particular queue, the age timer is reset for that queue. If the queue was considered aged and accordingly was given a higher SPL, the SPL will be lowered as the queue will not be considered aged anymore (age timer reset).

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

Different implementations may feature different combinations of hardware, firmware, and/or software. For example, some implementations feature computer program products disposed on computer readable mediums. The programs include instructions for causing processors to perform techniques described above.

The various embodiments are intended to be protected broadly within the spirit and scope of the appended claims.

What is claimed is:

1. A switching device comprising
a plurality of ingress ports to receive packets from external sources;
a plurality of egress ports to transmit the packets to external destinations;
a segmentation unit to store the packets received by the plurality of ingress ports as segments, wherein the packets having a length greater than a maximum segment length are divided into multiple segments;
a plurality of queues to store the segments waiting to be transmitted from the plurality of ingress ports to the plurality of egress ports, wherein the segments are stored in a particular queue based at least in part on ingress port and egress port for an associated packet;
a framer to aggregate a plurality of segments from one or more queues associated with a particular ingress port and a particular egress port to form a frame, wherein the frame has a maximum frame length, wherein the segments are retrieved from the one or more queues, and wherein the frame may contain segments associated with different packets;
a request generator to generate requests for permission to transmit frames from the queues, wherein a request indicates a cumulative amount of data contained in a respective queue and wherein the cumulative amount of data is defined in terms of equivalent frames;
a switching matrix to provide selective connectivity between the plurality of ingress ports and the plurality of egress ports; and
a scheduler to receive the requests, generate grants based thereon, and configure the switching matrix, wherein said scheduler operates on a pipeline schedule and modifies the requests received to update the cumulative amount of data indicated as being contained in the queues to subtract the equivalent frames associated with grants generated in current period or previous period that are not reflected in the queues yet.

2. The device of claim 1, wherein the plurality of queues include at least one queue per ingress port to egress port transmission path.

3. The device of claim 2, wherein the plurality of queues include at least one queue per priority.

4. The device of claim 2, further comprising a reassembly unit to combine the segments making up a complete packet together to generate the packet.

5. The device of claim 1, further comprising a deframer to extract the segments from the frame.

6. The device of claim 1, further comprising a striper to stripe the frames across a plurality of channels.

7. The device of claim 1, wherein said scheduler transmits a grant to an associated ingress port as part of the generate grants stage of the pipeline schedule and transmits a corresponding grant to an associated egress port as part of the configure the switching matrix stage of the pipeline schedule.

8. The device of claim 1, wherein the requests also indicate other factors, wherein the other factors include at least some subset of priority and aging.

9. The device of claim 8, wherein the scheduler assigns the requests internal priority numbers based on at least some subset of the cumulative amount of data and the other factors, and generates the grants based at least in part on the internal priority numbers associated with the requests.

10. A method comprising:

receiving packets from external sources;

breaking the packets received having a length greater than a maximum segment length into multiple segments;

storing the segments in queues, wherein the queues are associated with a packet flow from an external source from which a packet came and an external destination to which the packet is going;

aggregating a plurality of segments from one or more queues associated with a particular packet flow to form a frame, wherein the frame has a maximum frame length, wherein the segments are retrieved from the one or more queues, and wherein the frame may contain segments associated with different packets;

generating requests for permission to transmit frames from the queues, wherein a request indicates a cumulative amount of data contained in a respective queue and wherein the cumulative amount of data is defined in terms of equivalent frames;

receiving the requests at a scheduler operating on a pipeline schedule, wherein the scheduler generates grants based on the request and configures a switching matrix, wherein said scheduler modifies the requests received to update the cumulative amount of data indicated as being contained in the queues to subtract the equivalent frames associated with grants generated in current period or previous period that are not reflected in the queues yet; and transmitting the data to external destinations.

11. The method of claim 10, wherein the queues are also associated with priority.

12. The method of claim 4, further comprising reassembling the segments making up a complete packet together to generate the packet.

13. The method of claim 10, further comprising extracting the segments from the frame.

14. The method of claim 10, further comprising striping the frames across a plurality of channels.

15. The method of claim 10, further comprising the scheduler assigning the requests an internal priority number based on at least some subset of the cumulative amount of data and other factors indicated in the request, wherein the scheduler generates grants based at least in part on the internal priority number.

16. A store and forward device comprising a plurality of Ethernet cards to receive packets from and transmit packets to external sources, wherein the plurality of Ethernet cards include an ingress interface module to receive the packets from external sources, break the packets having a length greater than a maximum segment length into multiple segments, store the segments in queues associated with at least some subset of destination and priority, aggregate a plurality of segments from one or more queues associated with particular flows to form frames, generate requests that identify the cumulative amount of data in associated queues in terms of equivalent frames, and transmit frames from queues upon receipt of associated grants; and an egress interface module to receive the frames from the ingress interface module, extract the segments from the frames, reassemble the segments making up complete packets together, and transmit the packets to a destination;

a switching matrix to provide selective connectivity between the Ethernet cards;

a backplane consisting of a plurality of channels to connect the plurality of Ethernet cards to the switching matrix; and a scheduler to receive the requests, process the requests and generate grants therefrom, and configure the switching matrix accordingly, wherein said scheduler operates on a pipeline schedule and modifies the requests received to update the cumulative amount of data indicated as being contained in the queues to subtract the equivalent frames associated with grants generated in current period or previous period that are not reflected in the queues yet.

17. The device of claim 16, wherein the backplane is optical.

18. The device of claim 16, wherein the switching matrix is optical.

19. The device of claim 16, wherein the requests also indicate other factors, the other factors including at least some subset of priority and aging; and the scheduler assigns the requests internal priority numbers based on at least some subset of the cumulative amount of data and the other factors, and generates the grants based at least in part on the internal priority numbers associated with the requests.

* * * * *